United States Patent [19]

Usdin

[11] 3,793,150

[45] Feb. 19, 1974

[54] EQUINE STRANGLES VACCINE AND METHOD OF PREPARING AND USING THE SAME

[75] Inventor: Myron G. Usdin, Kansas City, Mo.

[73] Assignee: Richardson-Merrell Inc., New York, N.Y.

[22] Filed: Jan. 20, 1971

[21] Appl. No.: 108,147

[52] U.S. Cl. .................................... 195/96, 424/92
[51] Int. Cl. ......................... C12k 5/00, A61k 23/00
[58] Field of Search .......................... 424/92; 195/96

[56] References Cited

UNITED STATES PATENTS

| | | | |
|---|---|---|---|
| 3,145,144 | 8/1964 | Ando | 424/92 |
| 3,139,382 | 6/1964 | Killinger | 424/92 |
| 2,125,533 | 8/1938 | Winegarden et al. | 424/92 |
| 2,151,364 | 3/1939 | Winegarden | 424/92 |
| 3,208,909 | 9/1965 | Puziss et al. | 424/92 X |

OTHER PUBLICATIONS

Bazeley et al., Aust. Vet. J. 16:140–146 (1940) "Studies with Equine Streptococci."

Lowenthal, Brit. J. Exp. Path. 19:143–155 (1938) "The Preparation of Protective Sera Against Haemolytic Streptococci."

Mahaffey, Vet. Rec. 74 (47):1,302–1,313 (1962) "Strangles."

Engelbrecht, J.A.V.M.A. 155(2):425–427 (1969) "Vaccination Against Strangles."

Norcross, J.A.V.M.A. 155 (2):421–424 (1969) "Comments on Antigenicity of the Group C Streptococci."

Jubb et al., Pathology of Domestic Animals, Vol. 1, pp. 116–117, Academic Press, (1963).

Ueda et al., Vet. Bull. 36, No. 421 (1966) "Studies on Immunogenicity of Sal. abortusequi bacterin I, II."

*Primary Examiner*—Shep K. Ross

[57] ABSTRACT

A vaccine effective in immunizing equines against infection by virulent strains of *S. equi* may be prepared by extraction of *S. equi* bacteria to recover a proteinaceous antigen. The invention includes the vaccine, its method of preparation, and the immunization of equines therewith by intramuscular inoculation.

3 Claims, No Drawings

EQUINE STRANGLES VACCINE AND METHOD OF PREPARING AND USING THE SAME

This invention relates to a vaccine for the immunizing of equines against strangles and to a method of preparing and using the vaccine.

Strangles is a highly contagious disease of horses caused by *Streptococcus equi*. Although its rate of mortality is low, on the order of 2 percent, it is annoying and debilitating and affects large groups of horses when they are associated together as at racetracks, horse shows, sales lots and the like. The clinical signs of the disease are a rise in temperature to 104° to 106° F., increased rate of respiration, depression, anorexia, inflammation of nasal mucosa, catarrhal discharge, swelling of lymph nodes, development of abscesses, and other symptoms. The causative organism *S. equi* is very resistant and may survive for many months in stables and other places where horses are kept. Young horses are more susceptible to infection in view of the fact that the older animals have probably been in contact with the disease and have developed an immunity which is purportedly long lasting and highly effective.

When a virulent strain of *S. equi* appears among a group of non-immune horses, it is very difficult to prevent it from spreading. Bacterins effective against *S. equi* are available and have satisfactory immunizing properties. However, commercially available bacterins, which are suspensions of the killed microorganism *S. equi*, contain extraneous protein and carbohydrate fractions, both cellular and extracellular, which are responsible for many side reactions such as purpura, swelling at the site of injection, stiffness in the joints, transitory glandular swelling with nasal discharge, which reactions often result in inappetence, debility, loss of condition, and subclinical symptoms of the disease.

*S. equi* is classified as a Group C streptococcus, the strains of which share a common group-specific polysaccharide antigen. Strains of *S. equi* do not ferment lactose, sorbitol or trehalose. Colonies are generally mucoid and smooth and do not have the matt appearance of other streptococci which are known to produce a proteinaceous M-antigen.

The present invention is based upon my discovery that a highly effective antigen which will cause protective antibodies against *S. equi* to develop in horses when injected may be extracted from cultures of *S. equi*. The antigen upon which the new vaccine of the present invention is based is found on the cell surface of the bacteria and its presence is only coincidental with the group-specific polysaccharide antigen. It is proteinaceous in character and is destroyed by proteinases which also develop in the *S. equi* culture, and accordingly, means of reducing the destruction of the protein-antigen by these proteinases are employed in the culturing of the *S. equi* bacteria and in the extraction procedure.

The production of proteinases by streptococci is favored by reducing conditions in the culture medium, and therefore the cultivation of the *S. equi* should take place under aerobic conditions. In small scale production shaker flasks may be used, whereas when preparing larger quantities of the culture, as in tanks, the media may be aerated. The type of peptone in the medium has an effect on proteinase production. For example, Pfanstiehl peptone and proteose peptones favor production of the proteinases and should be avoided. Neopeptone produces a minimal concentration of the proteinase. Yeast extract also favors growth of the *S. equi* without promoting production of proteinases. Control of the temperature and hydrogen concentration of the medium will also inhibit formation of proteinase.

Certain chemical agents, such as formaldehyde, iodoacetic acid and β-propiolactone, will destroy the proteinases as well as kill the growing culture and may be used to stop the development of the proteinase which would otherwise destroy the antigen if left in contact with it. Heating the culture medium for a few minutes will also destroy the bacteria as well as the proteinase without undue damage to the antigen. Since the proteinase is found throughout the culture fluid, it is desirable that the fluid be removed from the bacterial cells as soon as the optimum production of antigen has taken place in the cells. This may be done by centrifugation. If acid extraction of the antigen from the freshly cultured *S. equi* cell can be carried out immediately after the culture has developed its maximum antigenicity, there is no need to kill the growing cells and destroy the proteinases or their precursors in the media before proceeding with the extraction.

The antigen may be extracted from the cellular material by a number of methods, but I prefer that it be extracted by heating at pH 2.0 with hydrochloric acid for ten minutes, as will be shown in the specific example which follows. Other acids which do not denature protein antigens may, of course, be used. The hydrogen ion concentration may be from about 1.5 to 6.0 with a longer period of extraction at the higher pH levels. It is also possible to extract the antigen in other ways. For example, the bacterial cells may be ground in a ball mill and extracted with buffered solutions of pH from 6 to 11 at 37° C. Ultrasonic vibrations will help release the antigen from the cell surface of the bacteria with which they are associated. Enzymatic action of phage-associated lysin may be used to help yield satisfactory preparations of the antigen.

Although the antigen may be used as a vaccine, as it is recovered by acid extraction and neutralized, and centrifuged to remove suspended particles, it may be purified still further, if desired, by chromatographic adsorption on a column, ammonium sulfate precipitation, zone electrolysis, and by other known techniques. It is preferred, for practical purposes, that it be used as a vaccine with an adjunct such as aluminum hydroxide gel as disclosed hereinafter. Other adjuncts such as aluminum phosphate may also be used with the antigen in the preparation of a vaccine suitable for use.

In order that the present invention may be more clearly understood, reference is made to the following procedure in which the vaccine of the present invention was prepared and proven to be effective.

EXAMPLE

A modified Todd-Hewitt broth containing the following ingredients per liter of distilled water was prepared.

Beef heart infusion from — 500 gm
Neopeptone — 20 gm
Dextrose — 10 gm
Sodium chloride — 2 gm
Disodium phosphate — 0.4 gm
Sodium carbonate — 2.5 gm Yeast extract (dehydrated) — 30 gm The medium was inoculated with a culture of *S. equi* obtained from a neck abscess of a horse showing typical strangles symptoms and otherwise identified as being *S. equi*. The cultures are grown for 4 to 20 hours at 37° C. at a pH of between 7.8 and 6.3 in cotton stoppered shaker flasks to allow aeration. At the time of harvest the cultures are checked for the presence of large capsules surrounding the *S. equi* cells and to assure purity. It is not necessary, however, that the bacteria have capsules since the antigen is not in the capsule. The capsule can be destroyed or removed prior to extraction of the antigen. Proper growth of the culture can be detected with the eye by an experienced technician. Uniformly good cultures are obtained with 6-hour growth at 37° C. using 5 to 10 percent inoculum. Such a culture will yield 2.5 grams of wet cells per liter.

Immediately after harvest, the cultures are killed as by the addition of β-propiolactone which drops the pH to 4.5. The cells are then centrifuged from the culture solution and frozen. The culture paste thus obtained is resuspended in saline at the rate of 5 g. of the moist paste for each 50 ml. of saline. The suspension is adjusted to a pH of 2.0 with 1 N hydrochloric acid and heated at 90°–95° C. on a boiling water bath for 10 minutes with stirring. A second extraction with half as much saline will yield additional antigen. The solution is cooled and adjusted to a pH of 7.4 ± 0.1 with 1 N sodium hydroxide and centrifuged. The sediment is discarded. The hydrogen ion concentration of the supernatant liquid containing the antigen is adjusted to pH 6 with 1 N hydrochloric acid and the volume brought up to 100 ml. with saline. Aluminum hydroxide gel is added to provide a 20 percent level and merthiolate is added as a preservative to a concentration of 1:10,000. This product constitutes the vaccine of the present invention.

To prove the effectiveness of the vaccine prepared as just described, 20 healthy horses susceptible to infection with virulent *S. equi* were obtained and divided into four groups of five each. The horses of one of these groups served as controls. All horses were bled prior to the first inoculation to provide serum for determining that they were free of *S. equi* antibodies.

One group of five horses was inoculated intramuscularly, each with 2 cc. of a whole cell suspension of *S. equi* prepared as follows:

A cell suspension of virulent *S. equi* was prepared by aerobically culturing the bacteria in a modified Todd-Hewitt broth as described above. The cell suspension was treated with β-propiolactone to achieve a pH of approximately 4.5 and 1:10,000 merthiolate, centrifuged, and a streptococcus paste made as in preparing the vaccine of the present invention, but without the hot acid extraction, to a final concentration of 50 mg. per 2 ml. dose. Five horses were each triple inoculated intramuscularly with 2 cc. of this whole cell suspension at 7-day intervals.

A second group of five horses was each triple inoculated intramuscularly with 10 cc. of a commercially available *S. equi* bacterin at 7-day intervals.

The third group of horses were each triple inoculated intramuscularly with 2 cc. of the acid extracted aluminum hydroxide adsorbed antigen described above at 7-day intervals.

All of the 20 horses of the four groups were maintained on a farm facility which was isolated and free from *S. equi* infection. They were challenged intranasally with a 12-hour culture of a combination of two strains of virulent *S. equi*.

As a result of the challenge, it was found that the control group had four out of five subjects exhibiting varying degrees of temperature elevation, unilateral and bilateral swellings of the lymph glands, and bilateral mucopurulent nasal discharge. This group experienced typical symptoms and lesions associated with *Streptococcus equi* infection.

The group that had been administered the whole cell suspension had four of the five subjects exhibit high temperatures, mucopurulent nasal discharge and glandular swellings. This group did not provide evidence of satisfactory protection against the challenge administered.

The group that had been inoculated with a commercially available bacterin had four of the five subjects exhibiting typical symptoms of strangles following challenge. This group experienced a mucopurulent nasal discharge, a loss of appetite and marked temperature elevations. Only one of the five in this group remained normal following challenge. No explanation for the poor showing of this commercial bacterin is apparent.

Finally, the group that had been administered the antigen prepared in accordance with the present invention remained essentially healthy throughout the study. One individual exhibited a transient nasal discharge. Following the first inoculation, some evidence of muscular swelling was noted. However, another batch of the vaccine of the present invention utilized in subsequent inoculations gave no further evidence of producing swellings.

Although in the vaccinations just described the horses were inoculated on three different occasions with 2 cc. of the acid extracted aluminum hydroxide adsorbed antigen, it will be apparent to those skilled in the art that the vaccination conditions may deviate somewhat from the protocols outlined above. For example, the horses were vaccinated with 2 ml. of a vaccine which contained the antigen extracted from 5 g. of the centrifuged *S. equi* cells per 120 ml. of vaccine and this vaccination was repeated for a total of three times at 1-week intervals. With more efficient production of antigen during the culturing period, more effective elimination of destruction of antigen by proteinases and recovery of antigen from the whole cells, and better adjuncts, the immunizing dosage of the vaccine would not require the antigen from so many cells per inoculation. Good protection against the rather severe challenge described above also indicates that lower amounts of the antigen would be effective in providing adequate protection. It can, therefore, be expected that a lesser number of inoculations of the antigen extracted from approximately 0.08 g. of freshly cultured encapsulated *S. equi* cells would be enough to induce an effective antibody response when inoculated intramuscularly in the horses. Repeated inoculations at suitable intervals of time tend to build up and establish a longer lasting immunity, as is known to those skilled in the art.

What is claimed is:

1. In a method of preparing a vaccine effective against virulent strains of *Streptococcus equi* wherein virulent *Streptococcus equi* bacteria are cultured under aerobic conditions in a culture medium producing minimum concentration proteinase under temperature (about 37° C.) and pH (about 7.8 to 6.3) conditions inhibiting formation of proteinase, until large capsules surrounding *Streptococcus equi* cells are present, the process improvement comprising separating the bacterial cells from their culture medium after about 4 to 20 hours of growth, extracting from the cell surface of the bacteria a proteinase-sensitive proteinaceous antigen which is not the capsule and which is effective against *Streptococcus equi*, by heating the bacterial cells to extract the proteinaceous antigen from the cells, adjusting the hydrogen ion concentration of the solution to above 7.0 to separate the spent cells from the extracted antigen, removing the insoluble material and adjusting the pH to below 7.0.

2. A method in accordance with claim 1 in which the antigen is extracted from the isolated bacterial cells by heating at 90° to 95° C. at a pH of 2.0 for approximately 10 minutes with agitation.

3. A method in accordance with claim 1 in which the *Streptococcus equi* bacteria are killed immediately after they have reached the desired degree of growth to kill the bacteria and destroy the proteinases and halt the further development of proteinases.

* * * * *